United States Patent
King et al.

(10) Patent No.: US 11,506,158 B2
(45) Date of Patent: Nov. 22, 2022

(54) TAMPER RESISTANT HYDROCARBON TRAP FOR COMBUSTION ENGINES

(71) Applicant: Ford Global Technologies, LLC, Dearborn, MI (US)

(72) Inventors: Alexander Adam King, Goodrich, MI (US); David S. Moyer, Sterling Heights, MI (US); Ha To Chung, Canton, MI (US); Roger Joseph Khami, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 138 days.

(21) Appl. No.: 16/931,724

(22) Filed: Jul. 17, 2020

(65) Prior Publication Data
US 2022/0018318 A1    Jan. 20, 2022

(51) Int. Cl.
*F02M 35/00* (2006.01)
*F02M 35/10* (2006.01)
*F02M 35/104* (2006.01)
*B01D 53/04* (2006.01)

(52) U.S. Cl.
CPC ... *F02M 35/10281* (2013.01); *B01D 53/0415* (2013.01); *F02M 35/104* (2013.01); *F02M 35/10144* (2013.01); *B01D 2257/702* (2013.01); *B01D 2259/4009* (2013.01); *B01D 2259/4516* (2013.01)

(58) Field of Classification Search
CPC ........... F02M 35/10281; F02M 101/44; F02M 101/104; B01D 53/0415; B01D 2257/702; B01D 2259/4009; B01D 2259/4516
See application file for complete search history.

(56) References Cited

U.S. PATENT DOCUMENTS

| | | | |
|---|---|---|---|
| 6,835,234 B2 | 12/2004 | Leffel et al. | |
| 6,905,536 B2 | 6/2005 | Wright | |
| 8,191,539 B2 | 6/2012 | Bellis | |
| 8,439,013 B2 | 5/2013 | Bellis | |
| 8,485,311 B2* | 7/2013 | Mackenzie | F02M 35/10321 285/302 |
| 2003/0192512 A1* | 10/2003 | Luley | F02M 33/02 123/519 |
| 2004/0112219 A1* | 6/2004 | Leffel | F02M 35/10019 96/108 |
| 2006/0150811 A1* | 7/2006 | Callahan | F02M 35/02 96/108 |

(Continued)

*Primary Examiner* — Phutthiwat Wongwian
*Assistant Examiner* — Sherman D Manley
(74) *Attorney, Agent, or Firm* — Vincent Mastrogiacomo; Brooks Kushman P.C.

(57) ABSTRACT

An air intake system for a combustion engine includes an air intake duct in fluid communication with an engine intake manifold and a conduit component inserted into the air intake duct along a first assembly direction. The air intake system also includes a hydrocarbon (HC) trap secured to the conduit component within the air intake duct. The conduit component defines at least one retention feature to maintain a position of the HC trap such that removal of the HC trap from the air intake duct results in structural compromise of the at least one retention feature. The air intake duct is also configured to shield the at least one retention feature from user access to inhibit user removal of the HC trap.

19 Claims, 11 Drawing Sheets

(56) References Cited

U.S. PATENT DOCUMENTS

| | | | |
|---|---|---|---|
| 2007/0186904 A1* | 8/2007 | Braithwaite | F02M 35/10144 123/434 |
| 2008/0093846 A1* | 4/2008 | Sparks | F16L 37/098 285/330 |
| 2009/0282793 A1* | 11/2009 | Tomlin | F02M 25/0854 55/385.3 |
| 2010/0065030 A1* | 3/2010 | Bellis | F02M 35/024 123/574 |
| 2010/0089372 A1* | 4/2010 | Bellis | F02M 25/089 123/573 |
| 2015/0075500 A1* | 3/2015 | Moyer | F02M 35/10144 123/519 |
| 2016/0059468 A1* | 3/2016 | Khami | F02M 33/043 264/516 |

* cited by examiner

TAMPER RESISTANT HYDROCARBON TRAP FOR COMBUSTION ENGINES

TECHNICAL FIELD

The present disclosure relates to a hydrocarbon trap for an internal combustion engine.

BACKGROUND

When an internal combustion engine is shut off, unburned hydrocarbon fuel vapors may remain in an intake manifold system, engine cylinders and/or an engine crankcase. These hydrocarbon fuel vapors may migrate out of the engine cylinders through an open intake valve into the intake manifold along with vapors from a crankcase through a crankcase ventilation system. The vapors in the intake manifold may also migrate through the fresh air intake system and then out into the surrounding atmosphere. This migration of the hydrocarbon fuel vapors has been shown to be enhanced by the rising and falling temperatures of the engine during engine off soak which can be caused by rising and falling ambient temperatures or other like conditions.

SUMMARY

An air intake system for a combustion engine includes an air intake duct in fluid communication with an engine intake manifold and a conduit component inserted into the air intake duct along a first assembly direction. The air intake system also includes a hydrocarbon (HC) trap secured to the conduit component within the air intake duct. The conduit component defines at least one retention feature to maintain a position of the HC trap such that removal of the HC trap from the air intake duct results in structural compromise of the at least one retention feature. The air intake duct is also configured to shield the at least one retention feature from user access to inhibit user removal of the HC trap.

An air intake system for a combustion engine includes an air intake duct in fluid communication with an engine intake manifold and a conduit component defining a first set of outward retention features to engage an inner wall of the air intake duct. The air intake system also includes a hydrocarbon (HC) trap disposed within the conduit component. The conduit component defines a second set of inward retention features to engage an end of the HC trap to maintain a position of the HC trap. The first set and the second set retaining features are shielded from access to inhibit user removal of the HC trap.

An air intake system for a combustion engine includes an air intake duct in fluid communication with an engine intake manifold and a conduit component inserted into the air intake duct along a first assembly direction. The air intake system also includes a hydrocarbon (HC) trap inserted into to the conduit component along a second assembly direction substantially opposed to the first assembly direction. The conduit component also defines a first retention feature to lockingly engage the air intake duct during insertion and a second retention feature to maintain a position of the HC trap. The first and second retention features are shielded from access once assembled to prevent user removal of the HC trap. A subsequent attempt to remove the HC trap from the air intake duct results in structural compromise of the at least one retention feature.

DETAILED DESCRIPTION

Figure 1:
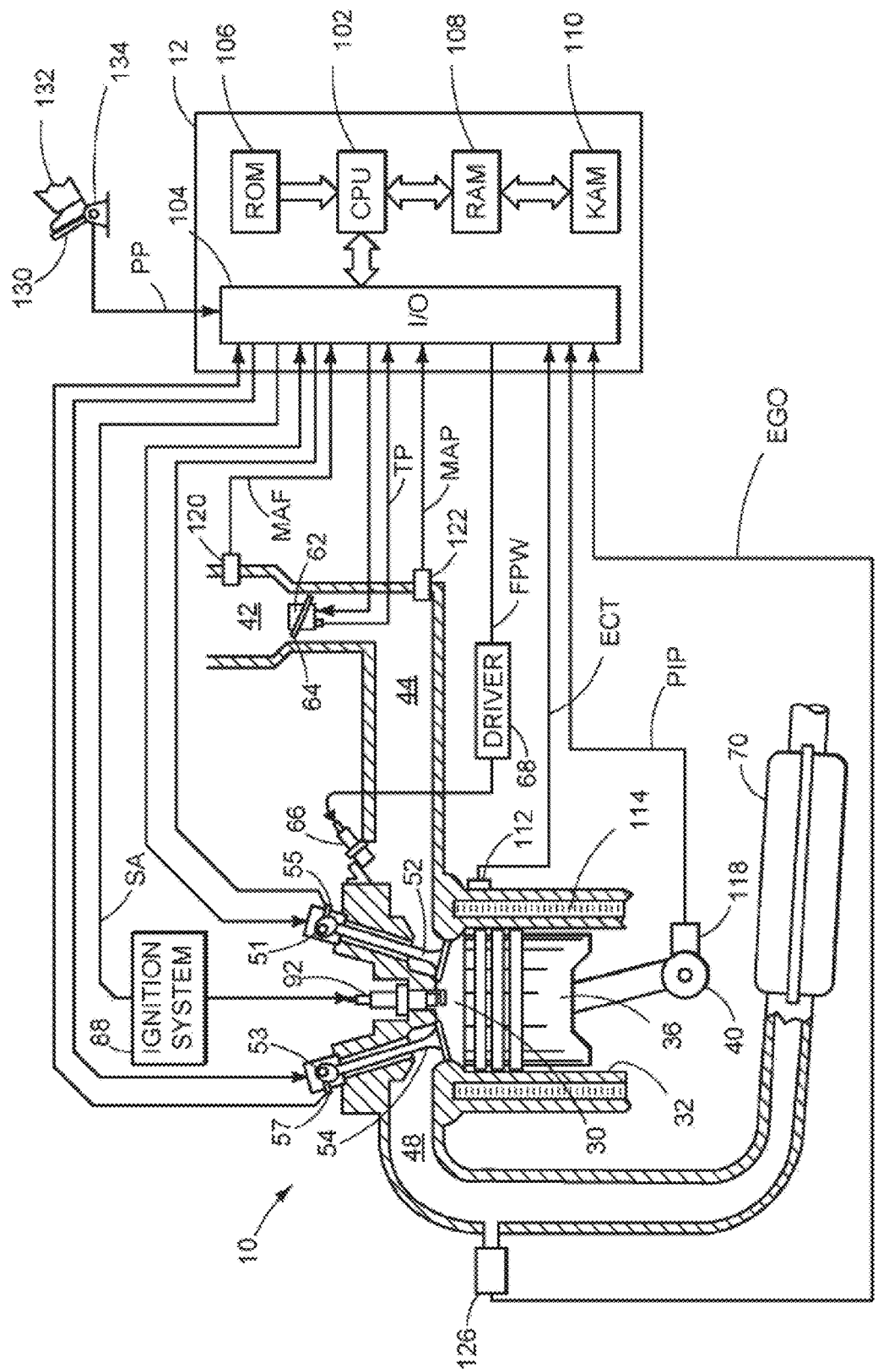
FIG. 1 is a schematic diagram of a vehicle engine having an air intake system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

During vehicle engine off periods, evaporative hydrocarbons (HC) may be emitted by the engine through the Air Induction System (AIS). The escape of the hydrocarbons from the air induction system may result in such hydrocarbons being released into the surrounding environment. Evaporative emission performance requirements may limit the total amount of HC that a vehicle is permitted to emit to the atmosphere. In cases where a vehicle AIS is a significant contributor to overall vehicle hydrocarbon levels, a hydrocarbon trap (HC trap) may be utilized to capture hydrocarbons during engine off and release and/or burn hydrocarbons during normal engine operation to meet acceptable vehicle evaporative emission levels. By implementing the HC trap configurations described herein, the amount of evaporative HC's released to the surrounding environment or atmosphere can be substantially reduced or eliminated.

Due to strict evaporative emission requirements, a flow-through HC trap may be provided to meet vehicle evaporative emissions targets. The flow-through design operates to efficiently provide adsorption and desorption of hydrocarbons. Such a HC trap may be disposed upstream and/or downstream of a mass air flow (MAF) sensor within an air intake passage. Based on one of numerous configurations, the flow-through HC trap may force substantially all vapors emanating from inside the engine during engine off soaks to pass through the HC trap before reaching the surrounding environment. Conversely, a bypass HC trap requires only a portion of the vapors emanating from inside the engine during engine off soaks to pass through the HC trap before reaching the surrounding environment. While a flow-through HC trap may generally be more efficient at reducing the amount of HC vapors emitted to the environment, a bypass trap may also reduce the release of such HC vapors and be used alone or in combination with one or more flow-through HC traps and/or bypass HC traps. Although generally described herein as a flow-through HC trap by way of example, it should be appreciated that the HC trap as disclosed may also be implemented as a bypass HC trap.

A vehicle AIS may include a HC trap having one or more hydrocarbon adsorbing surfaces within the AIS to adsorb vaporized hydrocarbons during engine off soaks to prevent or reduce the release of such hydrocarbons into the environment. The HC trap may be purged of the temporarily adsorbed HC vapors once the engine is restarted and such vapors may be consumed by the combustion which occurs during normal engine operation.

The HC trap may be configured as an adsorbing trap, such that the trap is adapted to collect and adhere HC gases on the surface of the adsorbing material in the trap (e.g., such as trapping the "light ends" of gasoline). These "light ends" of gasoline have been found to be one of the primary constituents of the vapors emanating from a typical air induction system during engine off soaks. Although described as an adsorbing trap, in some examples, different hydrocarbon adsorbing materials, where gases are collected by full assimilation or incorporation, may also be incorporated as part of the HC trap.

The HC trap may include a plurality of adsorbing channels formed by corrugated material, where the channels run parallel relative to an air flow axis, and perpendicular to the radial and/or the azimuthal axes. Such adsorbing channels may be longitudinal passages which enable air to flow through the HC trap. As engine off soak occurs, hydrocarbons, for example fuel vaporized from the engine, may backflow through the HC trap. The adsorbing material may adsorb hydrocarbons and may further store hydrocarbons until release of the hydrocarbons, to regenerate the adsorber. For example, the hydrocarbons may be released from the adsorbing material through air flow over the adsorbing material and/or through heating. Air flow through the trap may release the hydrocarbons from the adsorbing material. Further, as another example, the adsorbing material may be heated to a deadsorbing temperature at which point the hydrocarbons may be released from the adsorbing material. Thus, the adsorbing material may be regenerated. Hydrocarbons released from the HC trap may then be taken in by the engine for use in combustion during engine operation, such as during engine start up. In alternate examples, the adsorbing material may store hydrocarbons until the adsorbing material is regenerated in another way.

It should be appreciated that certain AIS HC trap conventional designs may not be readily scalable or translatable across different applications and use in different operating conditions. may require different dimensions for different applications. For example, in some engines, the engine volume may be greater relative to other engines, thus requiring a larger mass of air per engine cycle and larger adsorber channel openings. Moreover, reliable HC trap adsorption and desorption performance needs to be maintained over the useful life of the vehicle. Further, sufficient performance of evaporative emission controls may help avoid paying regulatory fees related to underperformance and/or noncompliance.

According to other aspects, a HC trap adsorptive element may be provided with tamper-evident features to comply with in use audit testing of a vehicle's emission system.

A standardized design may help to conserve capital and minimize investment cost while meeting all air induction system functional imperatives and evaporative emissions requirements. More specifically, existing HC trap designs may be integrated into also-existing MS duct systems. Discussed in more detail below, one or more intermediate low-cost components may be introduced to secure a HC trap to an AIS duct.

Referring to FIG. 1, a schematic diagram depicts one cylinder of a multi-cylinder engine 10, which may be included as part of a propulsion system of a vehicle. Each of the multiple cylinders may similarly include its own set of components as described below (i.e., intake/exhaust valves, fuel injector, spark plug, etc.).

Engine 10 may be controlled at least partially by a control system including controller 12 and by input from a vehicle operator 132 via an input device 130. In this example, input device 130 includes an accelerator pedal and a pedal position sensor 134 for generating a pedal position signal (PP). Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some examples, combustion chamber 30 may include two or more intake valves and/or two or more exhaust valves.

Intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative examples, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown arranged in intake passage 44 in a configuration referred to as port injection which introduces fuel into the intake port upstream of combustion chamber 30. Fuel injector 66 may inject fuel in proportion to the pulse width of signal (e.g., FPW) received from controller 12 via an electronic driver 68. Fuel may be delivered to fuel injector 66 by a fuel system (not shown) including a fuel tank, a fuel pump, and a fuel rail. In some examples, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 as well as other engine cylinders. The position of throttle plate 64 may be provided to controller 12 by throttle position signal (TP). Intake passage 42 may include a mass air flow (MAF) sensor 120 and a manifold air pressure (MAP) sensor 122 for providing respective signals (e.g., MAF and MAP) to controller 12. According to aspects of the present disclosure, the intake passage 42 may be part of an air intake system that includes an air filter and/or an AIS HC trap.

Ignition system 88 can provide an ignition spark to combustion chamber 30 via spark plug 92 in response to spark advance signal (SA) from controller 12. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or universal or wide-range exhaust gas oxygen (UEGO), a two-state oxygen sensor (EGO), a heated EGO (HEGO), a NOx sensor, HC sensor, or CO sensor. Emission control device 70 is shown arranged along exhaust passage 48 downstream of exhaust gas sensor 126. Device 70 may be a three-way catalyst (TWC), NOx trap, various other emission control devices, or combinations thereof. In some examples, during operation of engine 10, emission control device 70 may be periodically reset by operating at least one cylinder of the engine within a predetermined air/fuel ratio.

(Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The read-only memory 106 may be programmed with computer readable data representing instructions executable by processor 102 for performing various functions of the AIS.

Controller 12 may receive various signals from sensors coupled to engine 10, in addition to those signals previously discussed, including measurement of inducted airflow via a signal from MAF sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and an absolute manifold pressure signal from MAP sensor 122. Engine speed signal, RPM, may be generated by controller 12 from signal PIP. A manifold pressure signal from a MAP sensor may be used to provide an indication of vacuum, or pressure, in the intake manifold. Note that various combinations of the above sensors may be used, such as a MAF sensor without a MAP sensor, or vice versa. Under certain operating conditions, the MAP sensor 122 can give an indication of engine torque. Further, the MAP sensor 122, along with the detected engine speed, can provide an estimate of charge (including air) inducted into the cylinder. In other examples, sensor 118, which is also used as an engine speed sensor, may output a predetermined number of equally spaced pulses every revolution of the crankshaft.

The AIS may include along the air intake passage 44, a dirty air duct to receive unfiltered ambient air, an air box having an air filter disposed therein, and a clean air duct to pass filtered air to the engine 10. The air intake passage may also include one or more HC traps, such as a flow-through trap. One or more sensors, such as MAF sensor 120 may also be disposed along air intake passage 44. It should be appreciated that in addition to the above components, the air intake passage 44 may include additional ports, such as a break aspiration port, or a fuel vapor purging port, etc.

Figure 2:
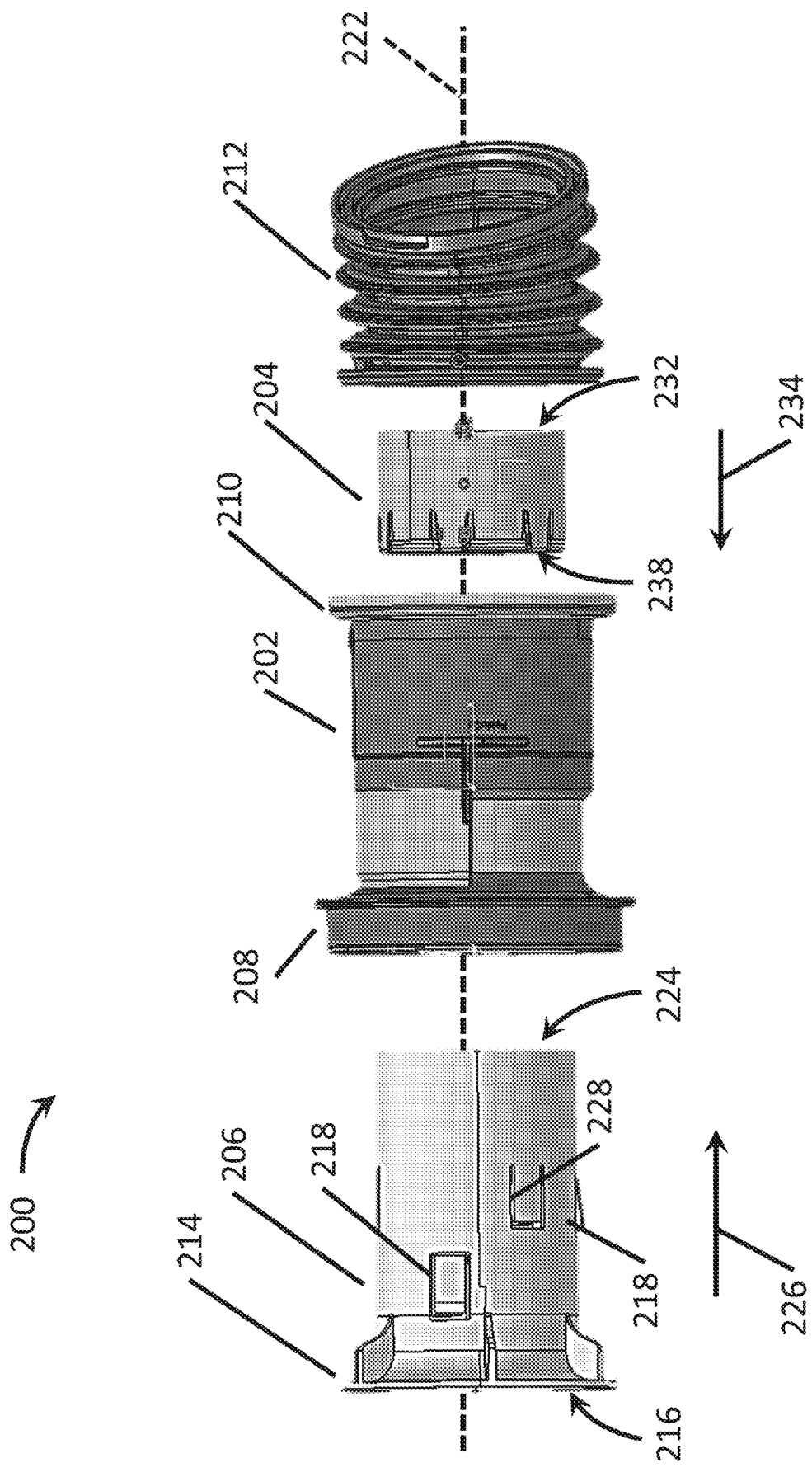
FIG. 2 is an exploded view of a first air intake system subassembly.
Figure 3:
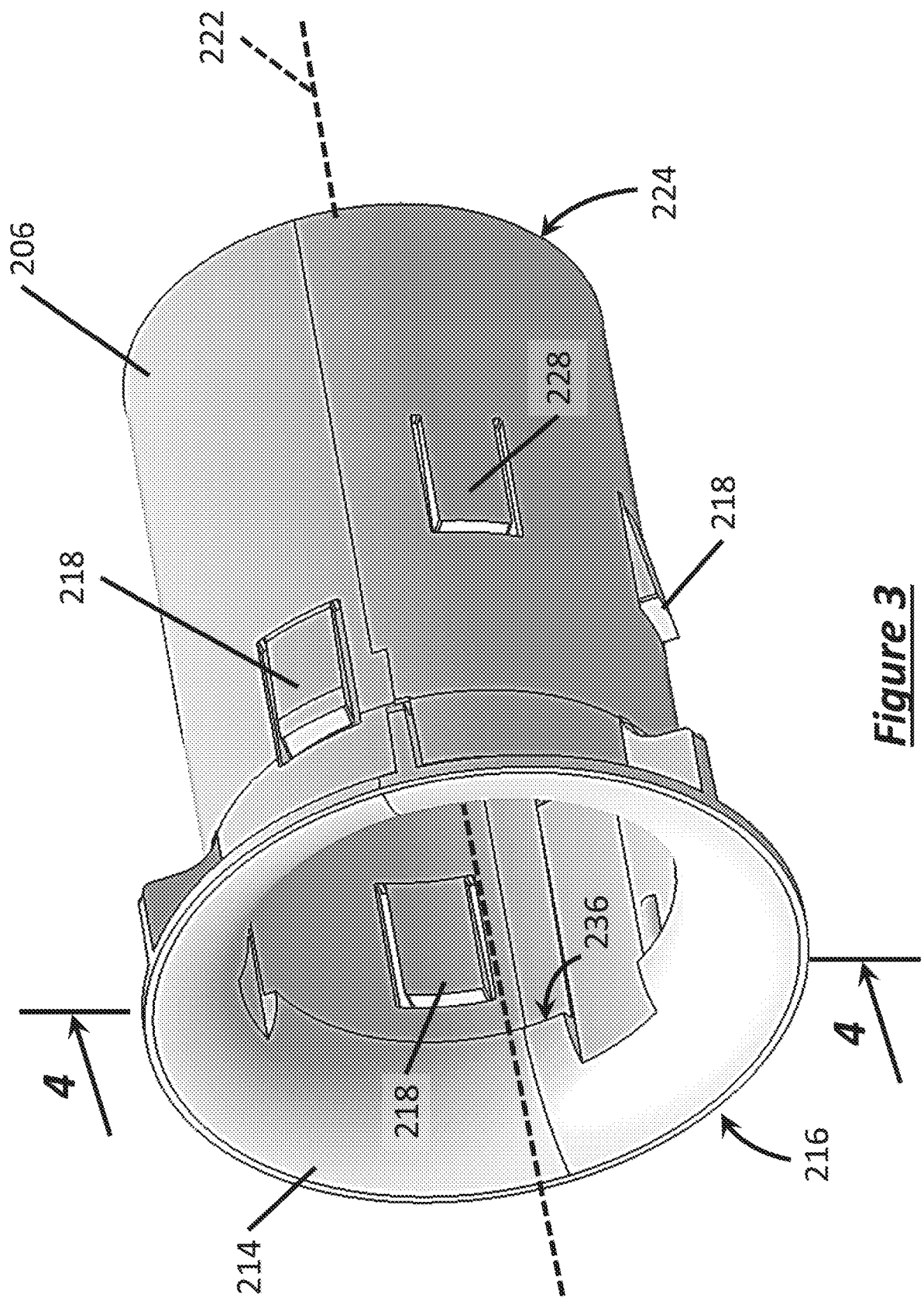
FIG. 3 is a perspective view of a conduit component of the first air intake system.
Figure 4:
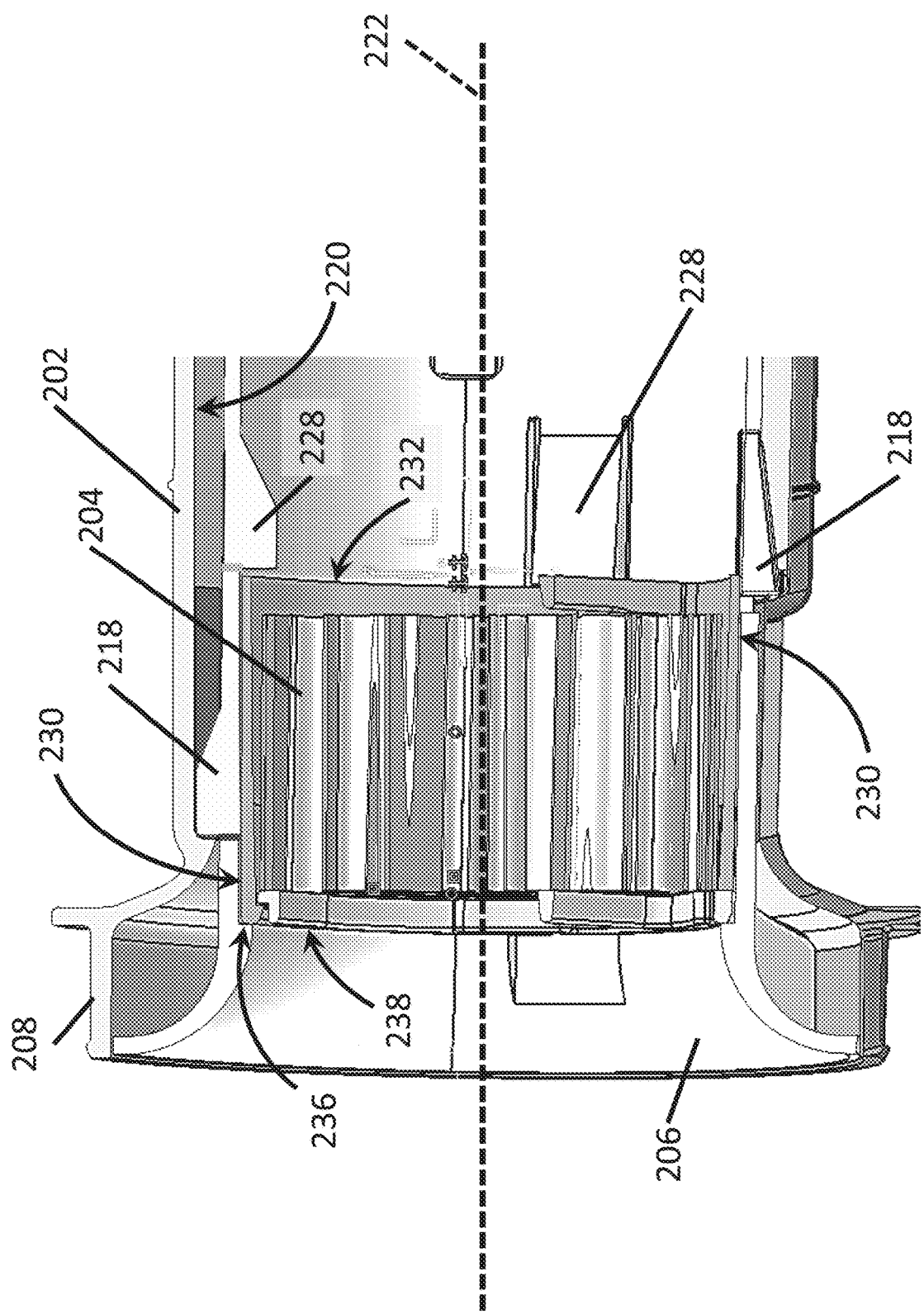
FIG. 4 is a partial cutaway view of the first air intake system along cut line 4-4.

Referring collectively to FIG. 2 through FIG. 4, portions of an air intake system (AIS) subassembly 200 are depicted. An air intake duct 202 is provided along an air intake passage to pass air to an engine. The air intake duct 202 may also include features to retain a MAF sensor to operate as discussed above. The intake duct may be a standardized component that is utilized in multiple vehicle applications both with and without a HC trap. In the example of FIG. 2 there may not be sufficient engagement features on the air intake duct 202 to retain HC trap 204 directly. A conduit component 206 may be provided to engage both of the air intake duct 202 and the HC trap 204 as well as provide tamper-proof features to indicate whether a user has attempted to remove the HC trap 204.

The air intake duct 202 includes a first end 208 configured to engage an air filter (not shown) upstream of the HC trap 204 and MAF sensor. The air intake duct 202 also includes a second end 210 configured to engage a flexible duct 212 downstream of the HC trap 204 and MAF sensor. According to some examples, the flexible duct 212 is formed from an elastomer material having convolutes to facilitate duct routing, engine motion, as well as retention to the air intake duct 202.

The conduit component 206 includes an inlet bell mouth feature 214 near a first end 216 to receive air passed from the air box and/or air filter. The conduit component 206 also defines a first set of retention features 218 extending radially outward to engage an inner wall 220 of the air intake duct 202. In some examples, the first set of retention features 218 may be provided as at least one radial snap configured to radially deflect inward toward a central axis 222 during installation and lockingly engage features on the air intake duct 202 once the conduit component 206 is fully installed. According to some installation examples, a second end 224 of the conduit component is initially inserted into the first end 208 of the air intake duct 202 along a first axial assembly direction 226. During insertion, retention features 218 are configured to lockingly engage air intake duct 202 once the conduit component 206 is located in an installed position. In some examples, the first set of retention features 218 is provided as a plurality of integrally formed radial snap tabs to align with, and snap into, an existing air intake duct 202. In alternate examples, the retention features may be configured as twist-lock features configured to lockingly engage the air intake duct by rotating the conduit component 206 once positioned within the center opening of the air intake duct 202. In further examples, the retention features may be equally or unequally distributed around the circumference of the conduit component 206. Additionally, the retention features may be staggered in the axial direction to coincide with geometric forms of the inner wall 220 of the air intake duct 202.

The conduit component 206 also defines a second set of retention features 228 extending radially inward to engage a second end 232 of the HC trap 204. In some examples, the second set of retention features 228 may be provided as radial snaps configured to radially deflect outward away from the central axis 222 during installation of the HC trap 204 into the conduit component 206. More specifically, the HC trap 204 is inserted along a second assembly direction 234 to snappingly engage the second set of retention features 228 of the conduit component 206 once the HC trap 204 is fully installed.

The conduit component 206 may define at least one stop feature 236 to set a fully inserted position of the HC trap 204. That is during installation, a user may push the HC trap 204 into the inner portion of the previously-installed conduit component 206 until a first end 238 of the HC trap 204 abuts the one or more stop features 236. In this way an installer may receive tactile feedback and simply push the HC trap 204 into the opening until it can insert no further. Once fully inserted, the second set of retention features 228 return to an undeflected position to abut the second end 232 and hold the HC trap 204 in place.

Once fully assembled, the AIS components of the present disclosure provide a unique tamper evidencing functionality. As best seen in the partial cutaway section of FIG. 4, once both of the conduit component 206 and the HC trap 204 are fully installed, the first set of retention features 218 are held in a non-deflected position and thus prevented from being released by a user attempting to remove the HC trap. More specifically, an inner surface of the first set of retention features 218 is arranged to abut an outer wall 230 of the HC trap 204 that was installed following the conduit component 206. It should be appreciated that while both of the first set of retention features 218 and the second set of retention features 228 are depicted in the same cutaway cross section of FIG. 4 by way of example, such features may be out of plane relative to each other and stationed at different circumferential positions about the conduit component 206. Additionally, and as depicted in FIG. 4, the first set of retention features 218 and/or the second set of retention features 228 may include individual elements that are axially staggered with respect to each other.

As best seen in FIG. 4, the first set of retention features 218 is blocked from access from users to deter tampering and/or removal of the HC trap 204. In some examples, the inner wall 220 shields at least one locking tab of the conduit component 206. A user may be prevented from easily accessing the locking tabs and thus may be required to structurally compromise or modify components in order to access and/or remove the HC trap 204. For example, the retention features may be required to be fractured, cracked, or otherwise broken in order to disassemble the components.

According to aspects of the present disclosure, an assembly method corresponding to the first example AIS subassembly may include the sequence steps of initially assembling a conduit component into an air intake duct along a first assembly direction to a fully seated position. The conduit component may lockingly engage the air intake duct when in the seated position. The assembly method sequence may also include assembling a HC trap into the air intake duct along a second assembly direction to a fully seated position. The HC trap may lockingly engage the conduit component when located in the seated position. The assembly sequence may further include securing a first end of the air intake duct to an air box and/or air filter, as well as securing a second end of the air intake duct to a downstream flexible elastomer duct.

Figure 5:
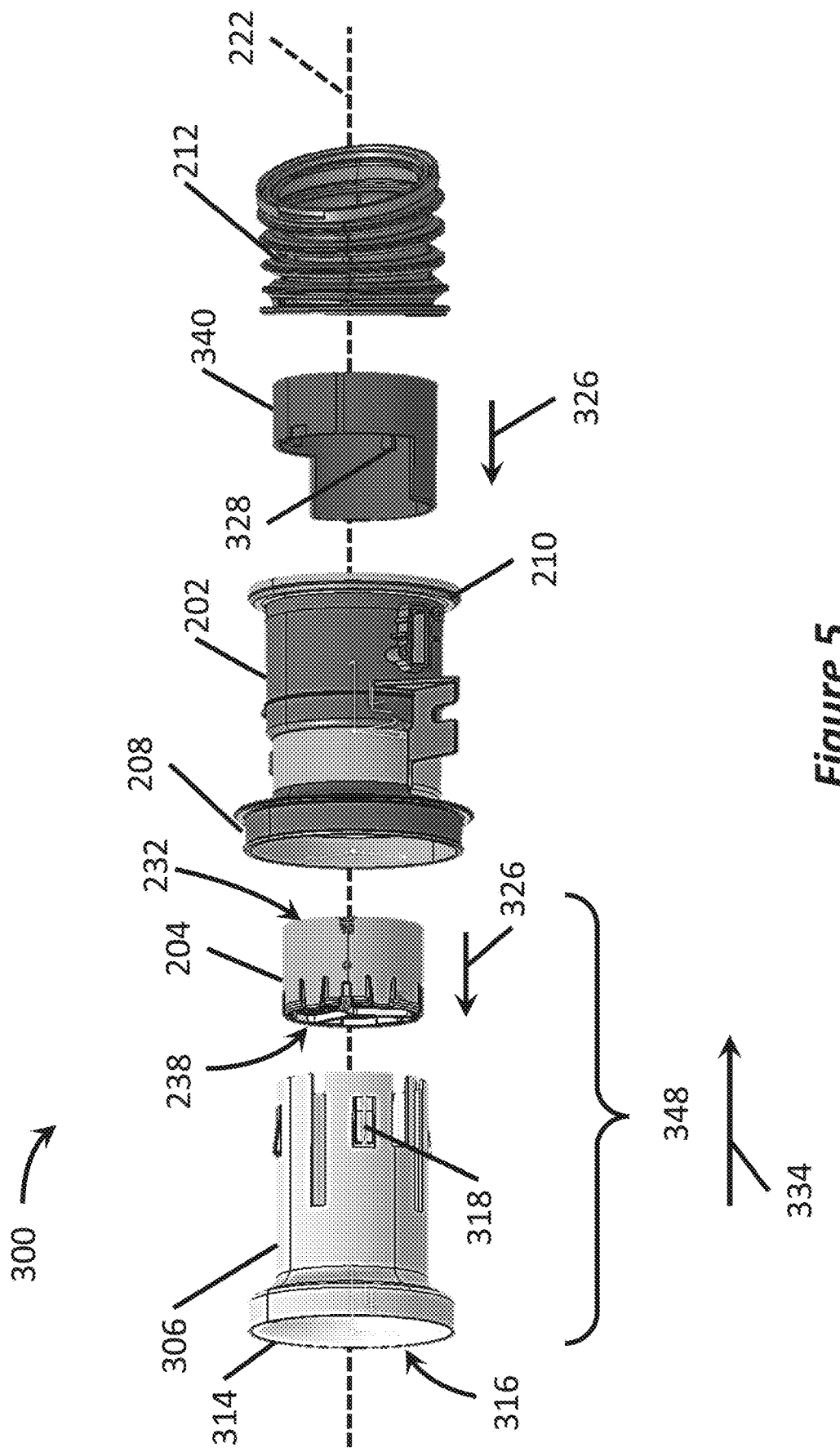
FIG. 5 is an exploded view of a second air intake system subassembly.
Figure 6:
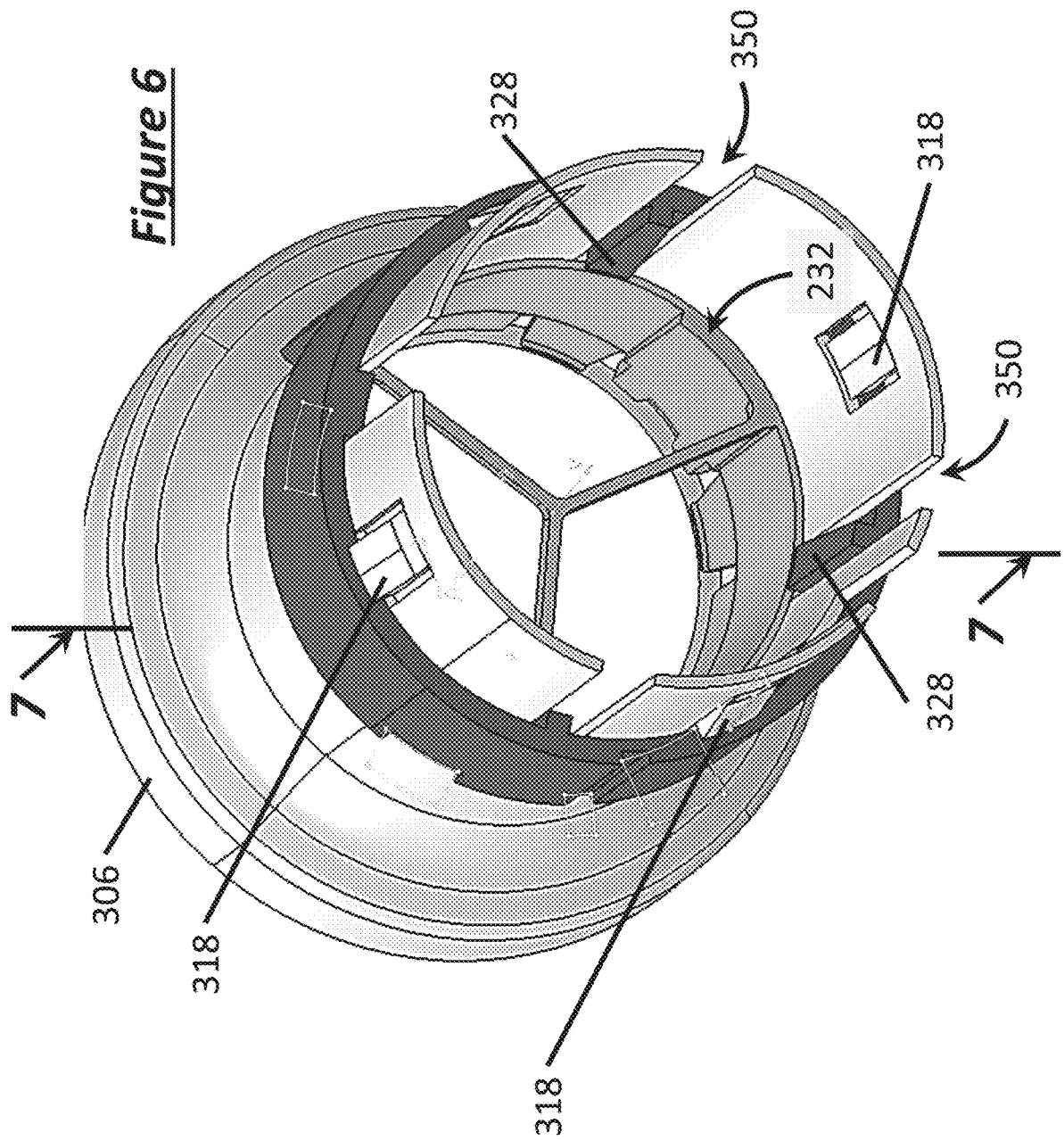
FIG. 6 is a perspective view of a conduit subassembly of the second air intake system.
Figure 7:
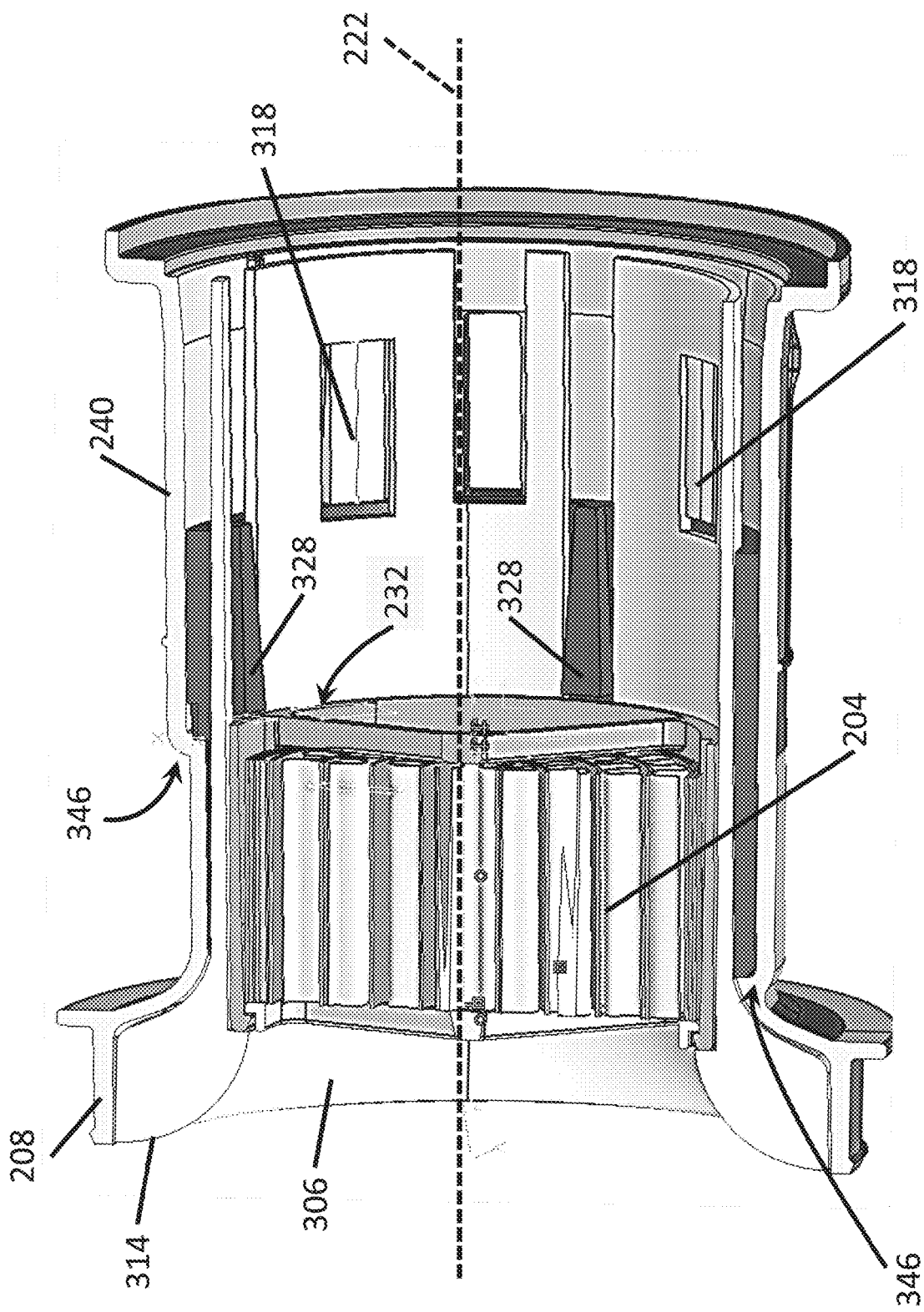
FIG. 7 is partial cutaway view of the second air intake system along cut line 7-7.
Figure 8:
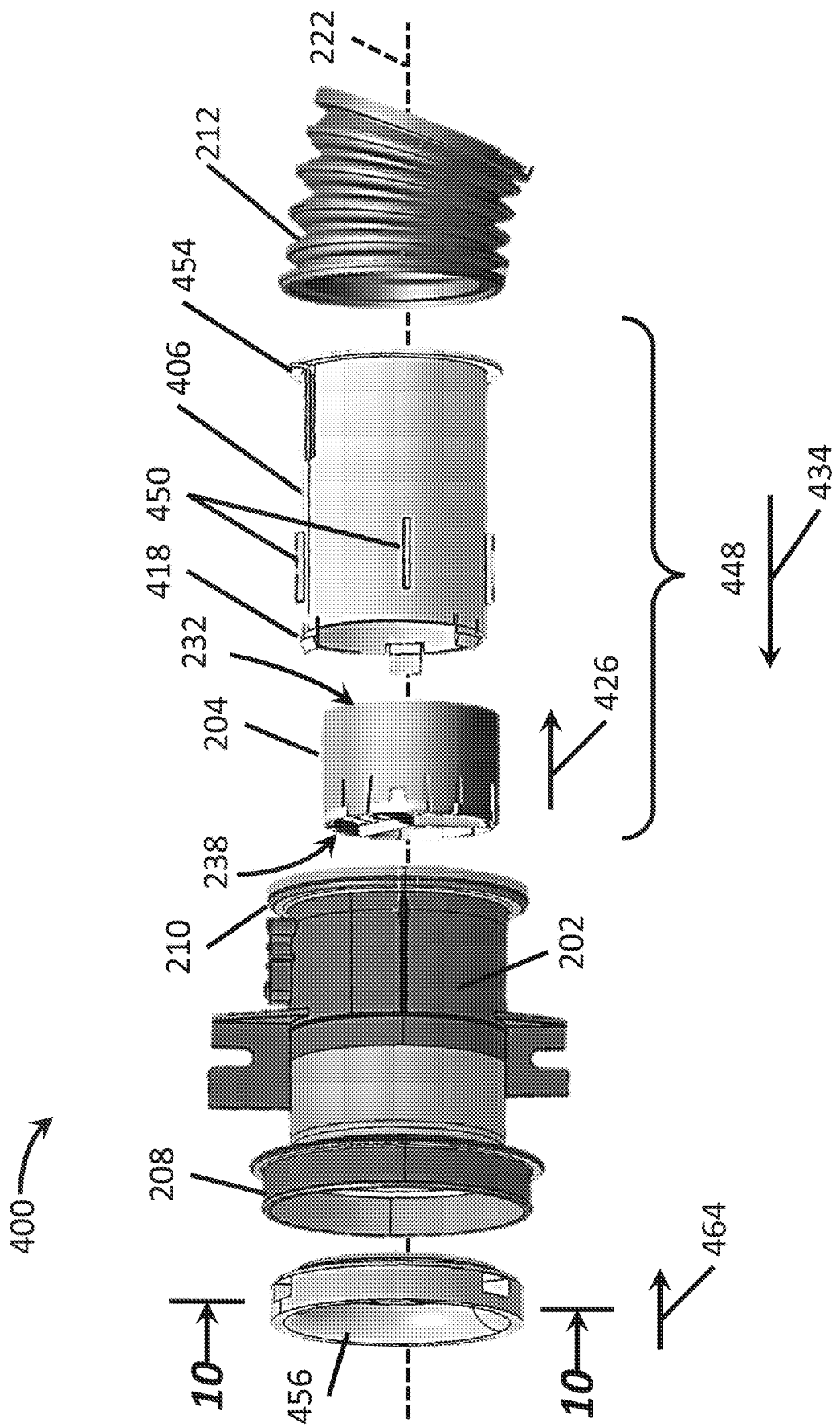
FIG. 8 is an exploded view of a third air intake system subassembly.
Figure 9:
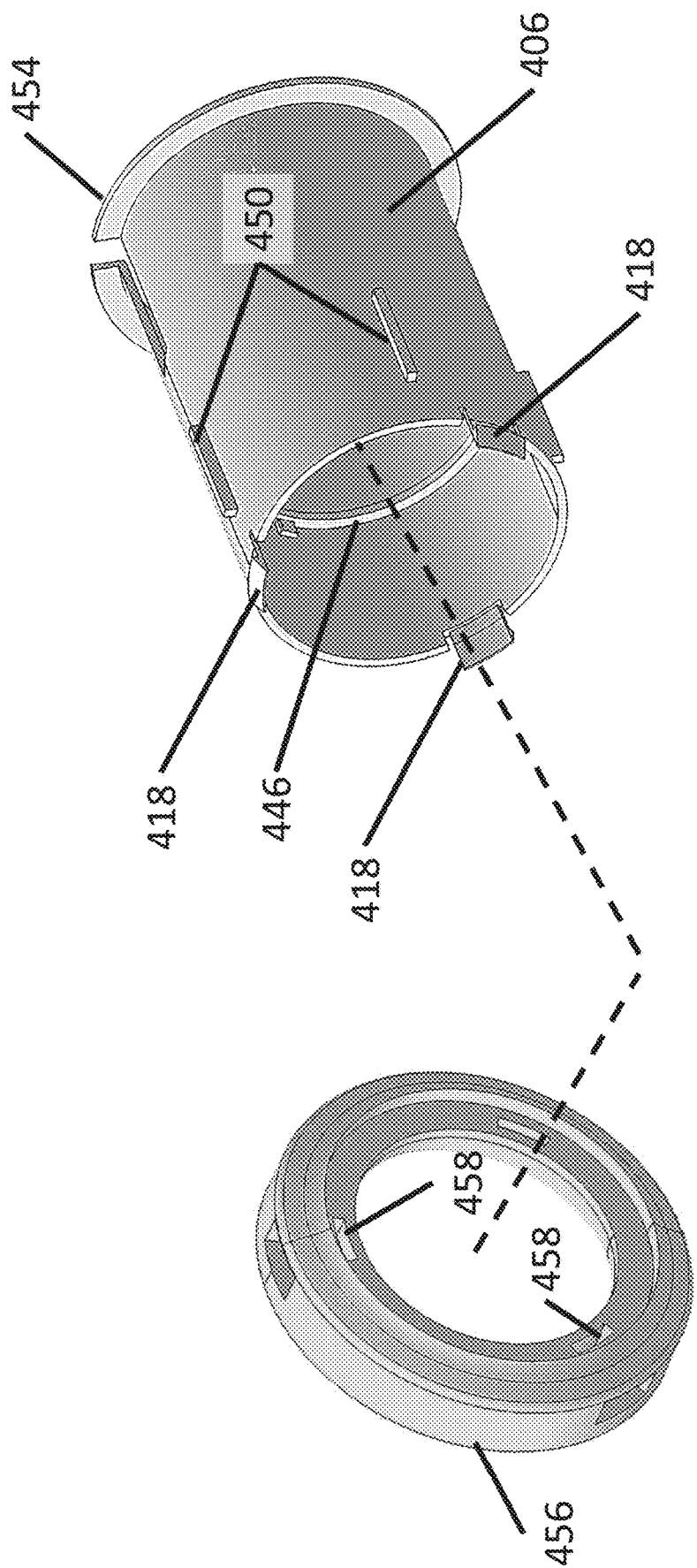
FIG. 9 is an exploded view of a conduit subassembly of the third air intake system.

Referring collectively to FIG. 5 through FIG. 7, a second example configuration of a HC trap retention is depicted as part of an AIS subassembly 300. Certain common components discussed above may also be utilized with a different mechanism for retaining a HC trap. An air intake duct 202 is provided along an air intake passage to pass air to an engine. As discussed above, the air intake duct 202 may also include features to retain a MAF sensor (not shown) within the intake airflow. The intake duct 202 may be a standardized component that is utilized in multiple vehicle applications both with and without a HC trap.

A conduit component 306 may be provided to serve as an interface between HC trap 204 and the air intake duct 202 and provide tamper-proof features to indicate whether a user has attempted to remove the HC trap 204. The air intake duct 202 includes a first end 208 configured to engage an air filter (not shown) upstream of the HC trap 204 and MAF sensor. The air intake duct 202 also includes a second end 210 configured to engage a flexible duct 212 downstream of the HC trap 204 and MAF sensor. The flexible duct 212 may be formed from an elastomer material having convolutes to facilitate duct routing as well as retention to the air intake duct 202 and/or engine motion.

AIS subassembly 300 also includes an insert component 340 to provide interfaces to engage the conduit component 306. According to some examples, the insert component 340 is first installed within an inner portion of the air intake duct 202 along a first assembly direction 326. The air intake duct 202 may include stop features 346 to define a fully installed position of the insert component 340 along the first assembly direction 326.

According to some examples the HC trap 204 is pre-assembled to the conduit component 306 prior to the conduit component being installed into the air intake duct 202. More specifically, the HC trap 204 may be inserted along first assembly direction 326 into an inner portion of the conduit component 306. Once the HC trap 204 is located at a final position relative to the conduit component 306, a conduit subassembly 348 may then be installed into the air intake duct 202.

The conduit component 306 includes an inlet bell mouth feature 314 near a first end 316 to receive air passed from the air box and/or air filter. The conduit component 306 also defines a first set of retention features 318 extending radially outward. In the example of AIS subassembly 300, the first set of retention features may be configured to engage the insert component 340 as opposed to the air intake duct 202 directly. According to some installation examples, the conduit subassembly 348 may be inserted into the first end 208 of the air intake duct 202 along a second axial assembly direction 334. During insertion, retention features 318 are configured to lockingly engage insert component 340 once the conduit subassembly 348 is located in an installed position. In some examples, the first set of retention features 318 is provided as a plurality of integrally formed radial snap tabs to align with, and snap into, an existing air intake duct 202. In alternate examples, the retention features may be configured as twist-lock features configured to lockingly engage the air intake duct by rotating the conduit component 206 once positioned within the center opening of the air intake duct 202.

According to aspects of the present disclosure, the first set of retention features 318 may be shielded by a wall 240 of the intake air duct 202 to prevent access to release the conduit subassembly 348. In this way the HC trap 204 may be permanently installed such that attempts at removal may show compromise and/or modification to the retaining components in order to indicate evidence of tampering.

The insert component 340 also defines a second set of retention features 328 extending radially inward to retain the HC trap 204 along the second assembly direction 334. In some examples the second set of retention features 328 include a plurality of fixed protrusions configured to engagingly abut the second end 232 of the HC trap 204.

In further examples, the second set of retention features 328 may also operate as angular alignment features to orient the conduit subassembly 348 with respect to the air intake duct 202. More specifically, the conduit component 306 may include one or more alignment features 350 to receive corresponding retention features 328. In specific examples, the alignment features 350 may comprise one or more slots to engage corresponding fixed protrusions stationed on the insert component 340 as the conduit subassembly 348 is installed to set a predetermined orientation of the conduit subassembly 348.

As best seen in FIG. 7, the first set of retention features 318 is blocked from access from users to deter tampering and/or removal of the HC trap 204. In some examples, the wall 240 shields at least one locking tab of the conduit component 306. A user may be prevented from easily accessing the locking tabs and thus may be required to structurally compromise or modify components in order to access and/or remove the HC trap 204. For example, the retention features may be required to be fractured, cracked, or otherwise broken in order to disassemble the components.

According to aspects of the present disclosure, an assembly method corresponding to the second example AIS subassembly may include the sequence steps of initially assembling an insert component into an air intake duct along a first assembly direction to a fully seated position. The assembly method sequence may also include inserting a HC trap into a conduit component along the first assembly direction to create a conduit subassembly. The assembly method sequence may further include assembling the conduit subassembly to the air intake duct along a second assembly direction to a seated position. The conduit subassembly may lockingly engage the insert component when in the seated position. The assembly sequence may further include securing a first end of the air intake duct to an air box and/or air filter, as well as securing a second end of the air intake duct to a downstream flexible elastomer duct.

Referring collectively to FIG. 8 through FIG. 11, a third example configuration of a HC trap retention is depicted as part of an AIS subassembly 400. Certain common components discussed above may also be utilized with a different mechanism for retaining a HC trap. An air intake duct 202 is provided along an air intake passage to pass air to an engine. As discussed above, the air intake duct 202 may also include features to retain a MAF sensor 452 within the intake airflow. The intake duct 202 may be a standardized component that is utilized in multiple vehicle applications both with and without a HC trap.

Figure 10:
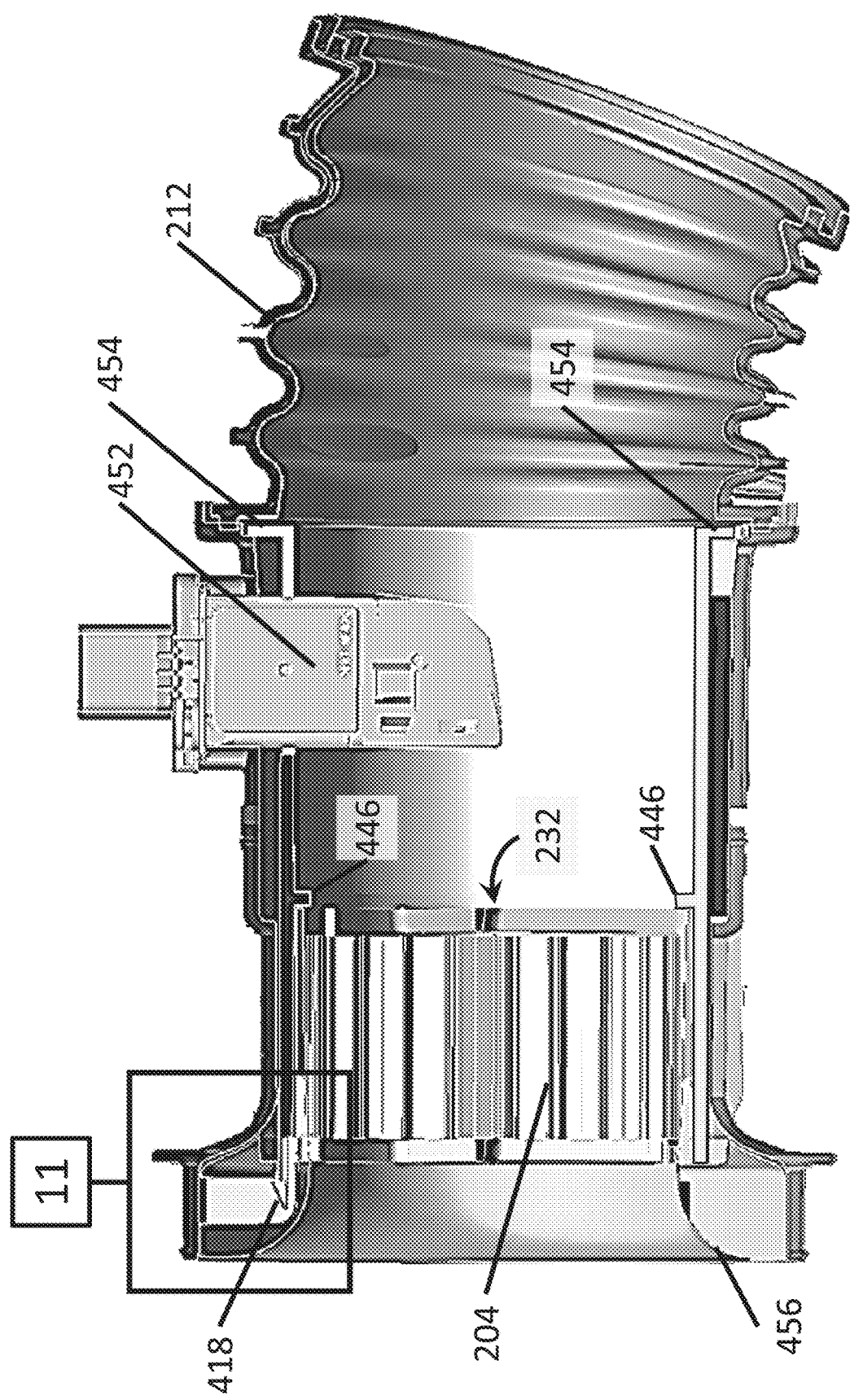
FIG. 10 is a is partial cutaway view of the third air intake system along cut line 10-10.

As best seen in FIG. 10, the HC trap 204 being positioned upstream of the MAF sensor 452 may be used to condition airflow passed to the MAF sensor 452. The HC trap 204 may include integrally molded radial orientation features to induce repeatable and predictable downstream air flow characteristics. The placement and geometry of the HC trap 204 may be tuned to optimize air flow conditioning to the MAF sensor 452. Operation of the HC trap 204 as an airflow straightener allows conditioned air to be presented to MAF sensor and a more acceptable noise-to-signal transfer function to be used during vehicle calibration. Thus, the HC trap 204 provides multiple functions to adsorbs hydrocarbons to meet evaporative emission requirements, as well as condition and/or straighten airflow presented to MAFS sensor.

A conduit component 406 may be provided to serve as an interface between the HC trap 204 and the air intake duct 202 and provide tamper-proof features to indicate whether a user has attempted to remove the HC trap 204. The air intake duct 202 includes a first end 208 configured to engage an air filter (not shown) upstream of the HC trap 204 and MAF sensor. The air intake duct 202 also includes a second end 210 configured to engage a flexible duct 212 downstream of the HC trap 204 and MAF sensor 452. The flexible duct 212 may be formed from an elastomer material having convolutes to facilitate duct routing, engine motion during operation, as well as retention to the air intake duct 202.

According to some examples, the HC trap 204 is pre-assembled to the conduit component 406 prior to the conduit component being installed into the air intake duct 202. More specifically, the HC trap 204 may be inserted along first assembly direction 426 into an inner portion of the conduit component 406. The conduit component 406 may include one or more internal stop features 446 to define a fully installed location of the HC trap 204. Once the HC trap 204 is located at a final position relative to the conduit component 406, the conduit subassembly 448 may then be installed into the air intake duct 202 along a second assembly direction 434.

The conduit subassembly 448 may be inserted through the second end 210 of the air intake duct 202. The conduit component 406 may be provided with external stop features 454 to define a fully inserted position of the conduit subassembly 448. More specifically, the external stop features 454 may abut an outer edge of the second end 210 of the air intake duct 202 when the conduit subassembly 448 is fully installed.

A bell mouth cap component 456 may be provided to retain the conduit subassembly 448 to the intake duct 202. The conduit component 406 may include a first set of retention features 418 to engage the bell mouth cap component 456. According to some examples, the first set of retention features 418 includes one or more locking tabs that secure the bell mouth cap component 456.

The bell mouth cap component 456 defines at least one receiving feature 458 to correspond to the first set of retention features 418. In some examples the at least one receiving feature 458 is a hole to engage a tang portion of a corresponding locking tab. The bell mouth cap may be installed by indexing the cap axially along a third assembly direction 464 to engage the first set of retention features 418 of the conduit component 406. In other examples, the receiving features 458 of the bell mouth cap component 456 may engage the first set of retention features 418 via a rotation or twist motion to lockingly engage the components. In this way the HC trap 204 is sandwiched between stop features of the conduit component 406 and a first wall portion 460 of the bell mouth cap component 456. It should be appreciated that the bell mouth cap component 456 may also be retained by alternate mechanical means, such as for example, spring clips, heat stakes, plastic welding, adhesives, rivets, push nuts, etc.

Figure 11:
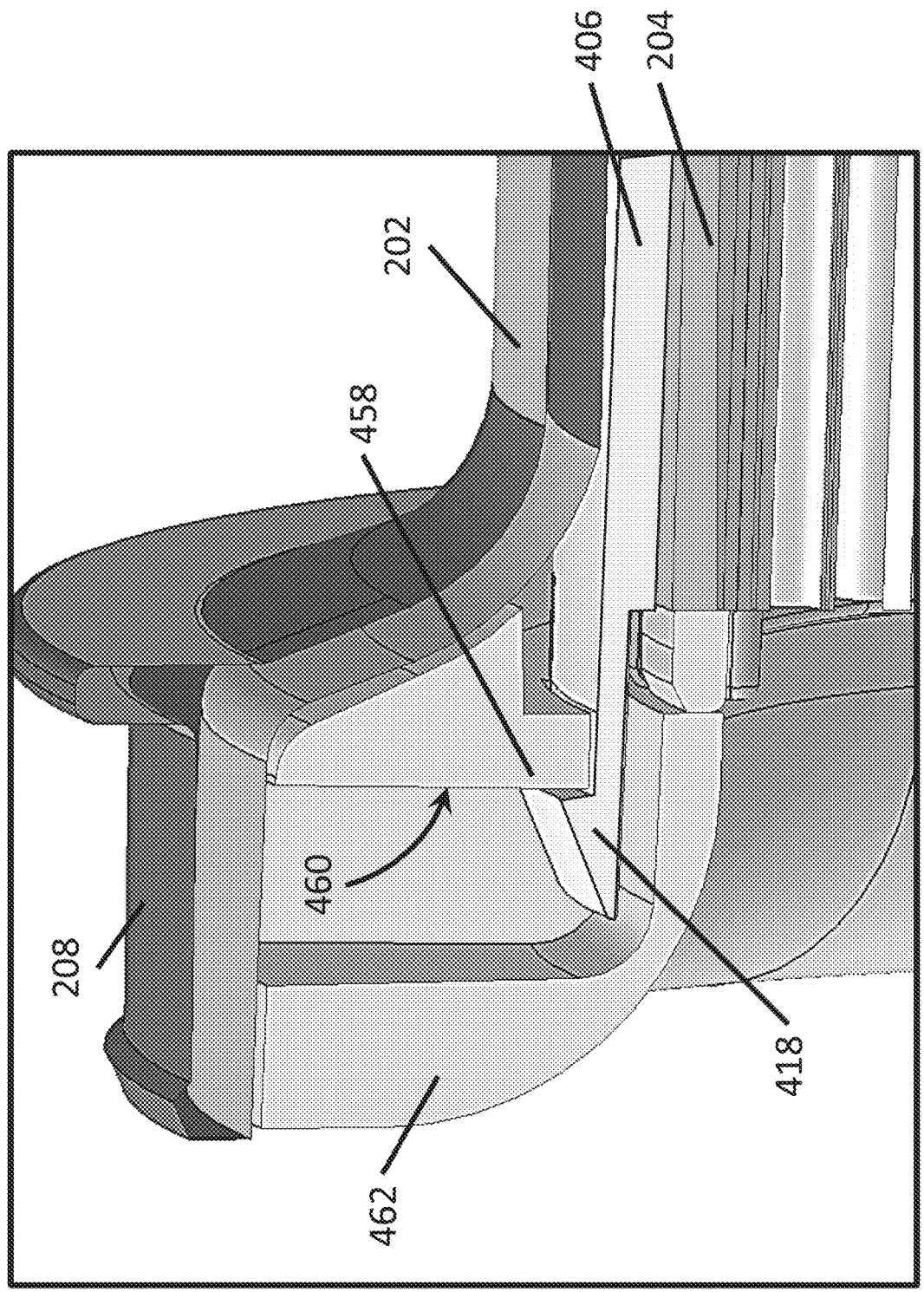
FIG. 11 is a magnified view of portion 11 of the cutaway view of FIG. 10.

As best seen in FIG. 11, the first set of retention features 418 is blocked from access from users to deter tampering and/or removal of the HC trap 204. In some examples, the bell mouth cap component 456 also includes a second wall portion 462 that shields at least one locking tab of the conduit component 406. A user may be prevented from easily accessing the locking tabs and thus may be required to structurally compromise or modify components in order to access and/or remove the HC trap 204. For example, the retention features may be required to be fractured, cracked, or otherwise broken in order to disassemble the components.

The conduit component may also include one or more alignment features 450 to be received by corresponding features disposed on in inner wall of the air intake duct 202. In specific examples, the alignment features 450 may comprise one or more ribs to engage corresponding slots stationed on the air intake duct 202 as the conduit subassembly 448 is installed in order to set a predetermined orientation of the conduit subassembly 448.

According to aspects of the present disclosure, an assembly method corresponding to the third example AIS subassembly may include the sequence steps of initially assembling a HC trap into a conduit component along a first assembly direction to create a conduit subassembly. The assembly method sequence may also include assembling the conduit subassembly to the air intake duct along a second assembly direction to a seated position defined by one or more stop features. The assembly sequence may further include securing a cap component to the conduit subassembly to maintain a fixed position of the HC trap and conduit subassembly. The assembly sequence may further include securing a first end of the air intake duct to an air box and/or air filter, as well as securing a second end of the air intake duct to a downstream flexible elastomer duct.

Aspects of the present disclosure provide unique advantages in that no additional or special tooling or fixturing is required to create a customized air intake duct. For example, low volume vehicles requiring a HC trap may still reap the benefits of economies of scale by sharing an existing or a common air intake duct with other vehicles that do not require a HC trap. In this way, common injection molding resins, tools, processes and techniques may be readily utilized across multiple vehicle lines having unique emissions requirements. Moreover, parts and tooling from existing vehicle applications may be readily reused with different configurations.

Additional aspects of the present disclosure provide tamper evident features which satisfy certain evaporative emissions testing protocols requiring such features. In this way users may not readily remove the HC trap and adversely affect evaporative emissions properties. At the same time, examples of the present disclosure facilitate ease of assembly by hand and without requiring tools. As discussed above alignment feature provide error-proofing regarding operator orientation of the HC trap and other components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An air intake system for a combustion engine comprising:
    an air intake duct in fluid communication with an engine intake manifold;
    a conduit component inserted into the air intake duct along a first assembly direction;
    a hydrocarbon (HC) trap secured to the conduit component within the air intake duct, wherein the conduit component defines at least one retention feature to maintain a position of the HC trap such that removal of the HC trap from the air intake duct results in structural compromise of the at least one retention feature and wherein the air intake duct is configured to shield the at least one retention feature from user access to inhibit user removal of the HC trap; and
    a bell mouth end cap adapted to retain to an end of the conduit component, and the HC trap arranged to be sandwiched between the conduit component and the bell mouth end cap.

2. The air intake system of claim 1, wherein the at least one retention feature comprises a set of deformable tabs that engage corresponding features of the air intake duct via an axial insertion of the conduit component into the air intake duct.

3. The air intake system of claim 1, wherein the at least one retention feature engages corresponding features of the air intake duct via rotation of the conduit component within the air intake duct.

4. The air intake system of claim 1, wherein the HC trap is preassembled to the conduit component as part of a subassembly prior to the conduit component being assembled to the air intake duct.

5. The air intake system of claim 1 wherein the at least one retention feature abuts an outer wall of the HC trap once installed to prevent release of the at least one retention feature.

6. The air intake system of claim 1, wherein the HC trap is inserted into the conduit component along a second assembly direction substantially opposite the first assembly direction.

7. The air intake system of claim 1, wherein the conduit component defines alignment features to engage corresponding receiving features of the air intake duct to set an angular position of the conduit component relative to the air intake duct.

8. An air intake system for a combustion engine comprising:
    an air intake duct in fluid communication with an engine intake manifold;
    a conduit component defining a first set of outward retention features to engage an inner wall of the air intake duct;
    a hydrocarbon (HC) trap disposed within the conduit component, wherein the conduit component defines a second set of inward retention features to engage an end of the HC trap to maintain a position of the HC trap, and the first set and the second set retaining features are shielded from access to inhibit user removal of the HC trap; and
    a bell mouth end cap adapted to retain to an end of the conduit component, wherein the second set of inward retention features comprises at least one internal stop feature, and the HC trap arranged to be sandwiched between the at least one internal stop feature and the bell mouth end cap.

9. The air intake system of claim 8, wherein at least one of the first set of outward retention feature comprises a deformable tab that engages an inner wall of the air intake duct during an axial insertion of the conduit component into the air intake duct.

10. The air intake system of claim 8, wherein at least one of the second set of inward retention feature comprises a deformable tab that engages an end wall of the HC duct during an axial insertion of the HC trap into the air intake duct.

11. The air intake system of claim 8, wherein the HC trap is preassembled to the conduit component as part of a subassembly prior to the conduit component being assembled to the air intake duct.

12. The air intake system of claim 8, wherein the conduit component is inserted into the air intake duct axially along a first assembly direction and HC trap is inserted into the conduit component along a second assembly direction substantially opposite the first assembly direction.

13. The air intake system of claim 8, wherein the conduit component defines alignment features to engage corresponding receiving features of the air intake duct to set an angular position of the conduit component relative to the air intake duct.

14. An air intake system for a combustion engine comprising:
an air intake duct in fluid communication with an engine intake manifold;
a conduit component inserted into the air intake duct along a first assembly direction;
a hydrocarbon (HC) trap inserted into to the conduit component along a second assembly direction substantially opposed to the first assembly direction, wherein the conduit component defines a first retention feature to lockingly engage the air intake duct during insertion and a second retention feature to maintain a position of the HC trap, and wherein the first and second retention features are shielded from access once assembled to inhibit user removal of the HC trap and wherein removal of the HC trap from the air intake duct results in structural compromise of the at least one retention feature; and
a bell mouth end cap adapted to retain to an end of the conduit component, wherein the second retention feature comprises at least one internal stop feature, and the HC trap arranged to be sandwiched between the at least one internal stop feature and the bell mouth end cap.

15. The air intake system of claim 14, wherein the HC trap is inserted into the conduit component as a conduit subassembly prior to the conduit component being inserted into the air intake duct.

16. The air intake system of claim 14, wherein the first retention feature comprises a set of deformable tabs that lockingly engage corresponding features of the air intake duct via an axial insertion of the conduit component into the air intake duct.

17. The air intake system of claim 14, wherein the first retention feature lockingly engages corresponding features of the air intake duct via rotation of the conduit component within the air intake duct.

18. The air intake system of claim 14, wherein the first retention feature abuts an outer wall of the HC trap once installed to prevent release of the first retention feature.

19. The air intake system of claim 14, wherein the conduit component defines alignment features to engage corresponding receiving features of the air intake duct to set an angular position of the conduit component relative to the air intake duct.

* * * * *